United States Patent [19]

Arns et al.

[11] Patent Number: 4,458,978

[45] Date of Patent: Jul. 10, 1984

[54] DOUBLE BEAM SYSTEMS FOR FORMING IMPROVED HOLOGRAMS

[75] Inventors: James A. Arns, Culver City; Timothy J. Edwards, Hermosa Beach; Gaylord E. Moss, Marina del Rey; John E. Wreede, Monrovia, all of Calif.

[73] Assignee: Hughes Aircraft Company, El Segundo, Calif.

[21] Appl. No.: 269,106

[22] Filed: Jun. 1, 1981

[51] Int. Cl.³ .............................................. G03H 1/02
[52] U.S. Cl. .................................... 350/3.67; 350/3.83
[58] Field of Search .................... 350/3.6, 3.65, 3.67, 350/3.83

[56] References Cited

U.S. PATENT DOCUMENTS

| | | | | |
|---|---|---|---|---|
| 3,494,698 | 2/1970 | Neumann | | 350/3.67 |
| 3,572,382 | 3/1971 | Neumann | | 350/3.67 |
| 3,632,182 | 1/1972 | Sincerbox | | 350/3.67 |
| 3,635,539 | 1/1972 | McMahon | | 350/3.67 |
| 3,659,947 | 5/1972 | Neumann | | 350/3.67 |
| 3,666,344 | 5/1972 | Mottiev | | 350/3.67 |
| 3,762,215 | 10/1973 | Aleksoff | | 350/3.67 |

OTHER PUBLICATIONS

Green, P. S., (Ed.), *Acoustical Holography,* vol. 5, pp. 41-45, Plenum Press.
Collier et al., *Optical Holography,* pp. 418-425, 437-438, Academic Press, 1971.
Ross, M. (Ed.), *Laser Applications,* vol. 1, pp. 42-49, Academic Press, 1971.

*Primary Examiner*—Bruce Y. Arnold
*Attorney, Agent, or Firm*—Craig B. Bailey; A. W. Karambelas

[57] ABSTRACT

The systems of the invention form improved reflection and transmission holograms utilizing two beams and eliminating all of the higher energy spurious holographic recordings that are caused by reflections of rays from the outer surfaces of the cover plates. The systems provide movement of the cover plate or movement of the substrate and recording medium during the recording period to prevent formation of the spurious recordings. In some arrangements of the invention, global phase shifters are utilized to maintain the phase of the primary rays forming the desired hologram at a high level.

29 Claims, 22 Drawing Figures

Fig. 8.
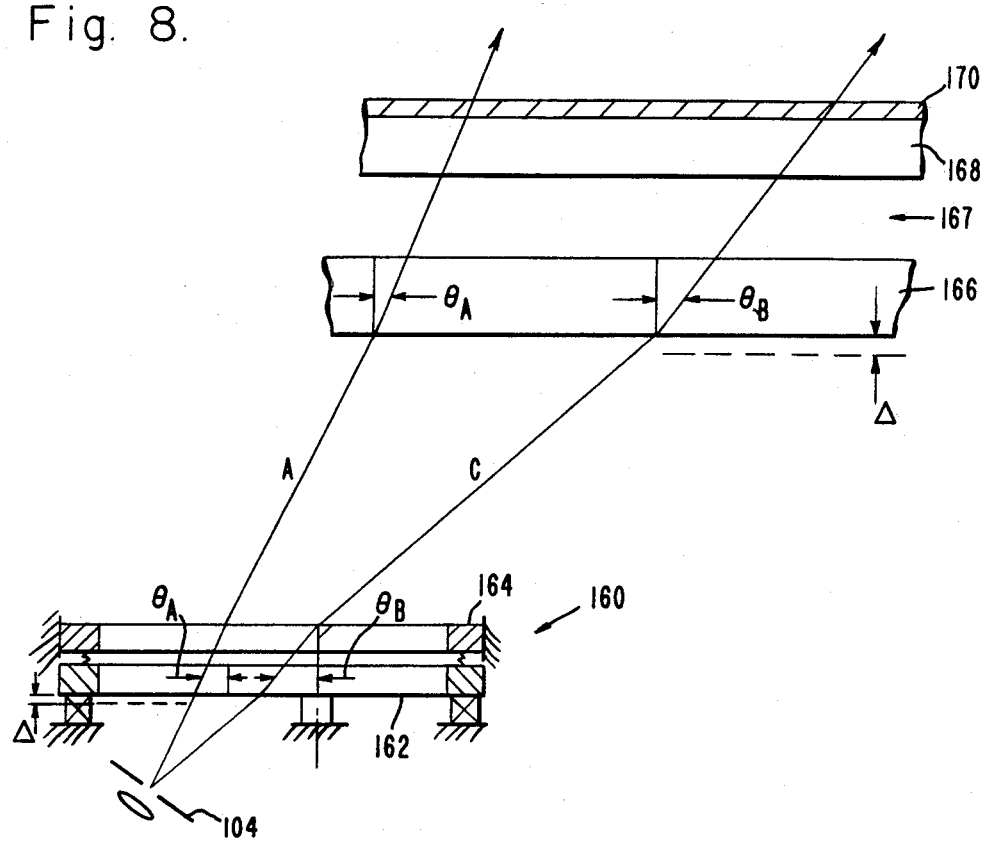
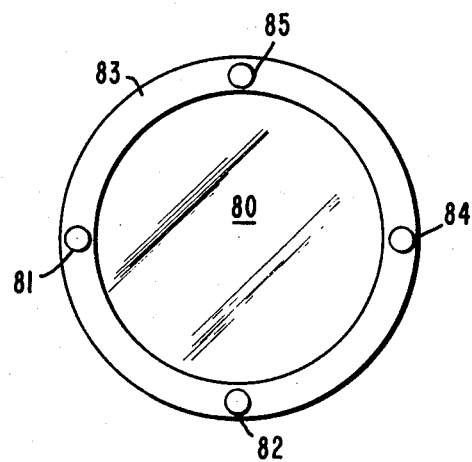
Fig. 7.

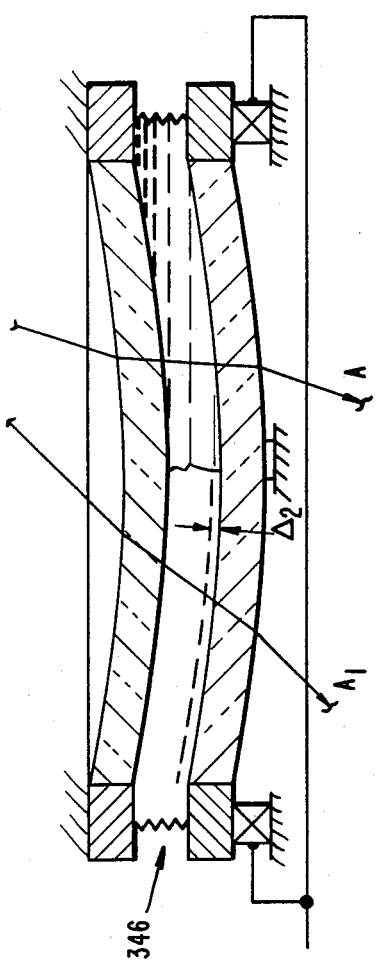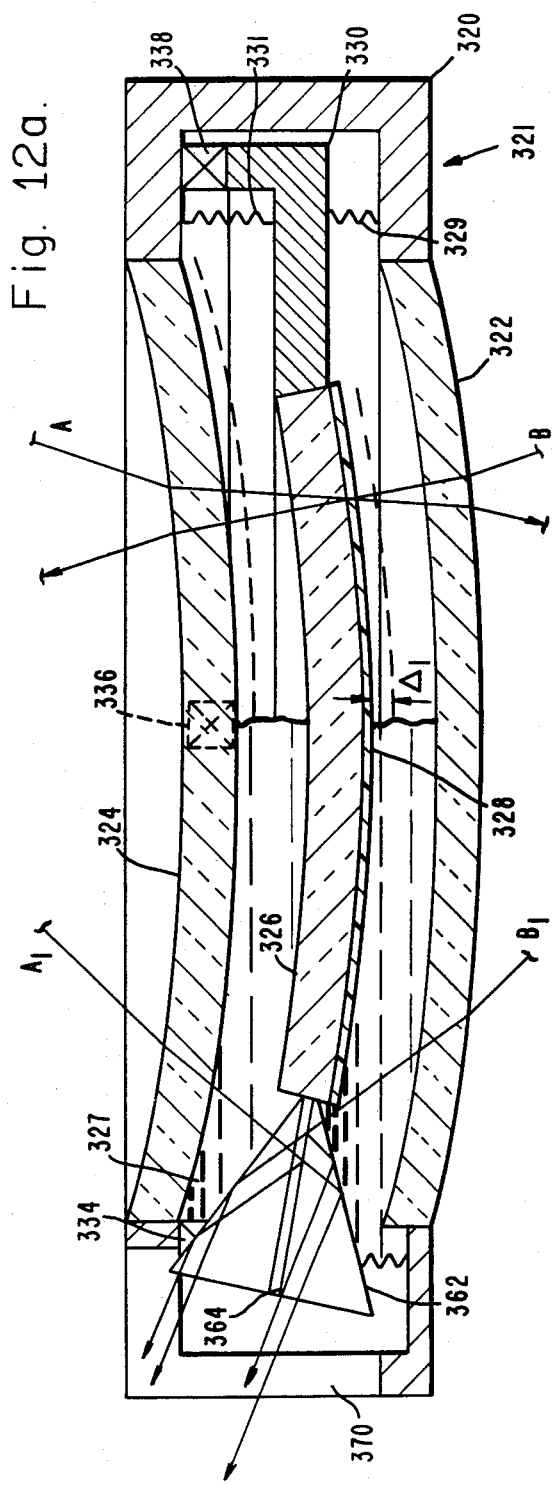

DOUBLE BEAM SYSTEMS FOR FORMING IMPROVED HOLOGRAMS

TECHNICAL FIELD

This invention relates to a system and method of forming improved holograms and particularly to a system and method that eliminates noise holograms, due to spurious reflections, from forming in the hologram.

CROSS REFERENCE TO RELATED APPLICATIONS

This application is related to U.S. patent application No. 269,104, Systems For Forming Improved Diffusion Holograms by James A. Arns, Timothy J. Edwards, Gaylord E. Moss and John E. Wreede; and U.S. patent application No. 269,105, Systems For Forming Improved Reflection Holograms with a Single Beam, by James A. Arns, Timothy J. Edwards, Gaylord E. Moss and John E. Wreede; both referenced applications being filed concurrently with this application.

BACKGROUND OF THE INVENTION

1. Field of the Invention

One of the problems associated with holograms is that diffraction optics displays utilizing a hologram are degraded by the effects of the spurious reflection and transmission hologram recordings that are generated during the holographic exposure process. These spurious holograms have been found to be generated by reflections from surfaces which are interfaces of materials of differing index of refraction, such as air to glass interfaces, of the surfaces of the recording cover plates, the substrate or the optical elements which interfere with the main holographic beams and with each other to form both spurious reflection hologram recordings and spurious transmission hologram recordings on the recording film. In a display utilizing a hologram the spurious reflection hologram recordings create ghost images and the spurious transmission hologram recordings create rainbow-like flare patterns. The purpose of this invention is to prevent the recording of the unwanted spurious holograms that are caused by reflections and thus to eliminate both ghost and flare images in the final display.

2. Description of the Prior Art

Prior to this invention there was no known method to reduce the flare and ghost images of holograms to acceptable levels. The basic approaches that have been utilized in an attempt to minimize the problem are either to anti-reflection coat all surfaces, to embed all optical elements in an index matching fluid when forming the holograms such that no air-to-glass interface reflections reach the active area, or to form the holograms with the beams impinging the recording medium at the Brewster's angle. The first method has been found to be inadequate because the best known anti-reflection coating provides results that are many times worse than required. The second method is generally unsuccessful because the striations in large fluid volumes degrade the holographic recording process. The third method is unsatisfactory because of the restriction of the angular placement of the recording, and hence playback, beams to the recording medium.

SUMMARY OF THE INVENTION

It is therefore an advantage of the invention to provide a system for forming holograms in which undesired spurious holographic recordings due to surface reflections are eliminated.

It is a further advantage of the invention to provide a system for forming display holograms in which ghost images and rainbow-like flare patterns are eliminated.

It is another advantage of the invention to provide a system and method for forming improved transmission holograms.

It is still another advantage of the invention to provide a system and method for forming improved reflection holograms.

The hologram forming arrangements in accordance with the principles of the invention prevent the formation of undesired spurious hologram recordings by moving the reflecting surfaces during the recording process or by moving the recording medium during the recording process. The movement may be continuous or a step motion within the scope of the invention. The rays reflected from the reflecting surfaces are changed in phase during the recording process so that undesired combinations of reflected and primary rays or two reflected rays continually change their relative phase. Thus, the phase coincident positions of rays, which would provide undesired recordings, continually move along the recording medium and their efficiency is reduced so that they are unable to create spurious recordings of sufficient intensity at any point to adversely effect the final hologram. At the same time, in some arrangements in accordance with the invention, the primary rays are also changed in phase at the recording medium by the movement of the reflecting surfaces or the recording medium. The relative phases of the rays of the primary beams must be maintained constant during the recording period to maintain full efficiency of the primary hologram. To control the phase of the primary beams, one or more improved phase shifters are provided to vary the phases of the recording beams so as to maintain full efficiency of the primary hologram. The concepts of the invention include formation of transmission holograms with all reflecting surfaces being continually moved and the formation of transmission holograms with the recording medium being continually moved while the reflecting surfaces are maintained stationary. The concepts of the invention also include formation of reflection holograms with all reflective surfaces being moved and the formation of reflection holograms with the recording medium being moved while the reflecting surfaces are maintained stationary. All of these holographic recording arrangements continually change the phase relationship between the primary beam and the reflected beams at the position of the recording medium so that the principle spurious hologram recordings are effectively smeared along the recording medium and have a minimal intensity. A global phase shifter, which may be utilized in the primary beams of the hologram forming systems in accordance with the invention, is provided to correct the phase variations of the primary beams. This phase correction is accurately performed over the entire surface of the recording medium and at the different angles at which the primary rays are applied to the recording medium. A sensing system controls the movement of one surface of the global phase shifter in correspondence to the movement of the reflecting surfaces or the recording medium so that the efficiency of both of the primary beams is maintained at a high level and is not effected by the operation to eliminate the spurious hologram recordings. One system in accordance with the principles of the invention, prevents the formation of at least the principle spurious hologram recordings without using the global phase shifters.

BRIEF DESCRIPTION OF THE DRAWINGS

The novel features that are considered characteristic of this invention are set forth with particularity in the appended claims. The invention itself, both as to its organization and method of operation as well as additional objects and advantages thereof, will best be understood from the following description when read in connection with the accompanying drawings in which like reference numbers refer to like parts and in which:

FIG. 7 is a sectional view taken at lines 7—7 of FIG. 5 for further explaining the structure of the global phase shifters;

FIG. 8 is a schematic partially fragmentary side view of a global phase shifter operating with one reflecting surface of the recording structure for further explaining the operation of the global phase shifters in accordance with the principles of the invention;

DETAILED DESCRIPTION OF THE INVENTION

Figure 1:
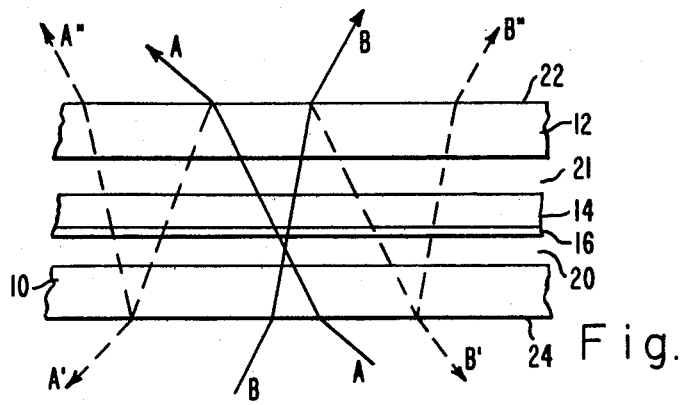
FIG. 1 is a schematic fragmentary side view of a portion of a transmission hologram forming structure for explaining the reflective beams or rays that are present to form spurious hologram recordings.

Referring first to FIG. 1 which shows a cross-sectional side view of a structure similar to that utilized to provide the transmission holograms in accordance with the invention but having reflective surfaces typical of prior art structures, the spurious hologram recording problem will be explained. The recording structure for forming a transmission hologram includes first and second cover plates 10 and 12 shown flat for convenience of illustration but which may be curved as is well known in the art. It is to be noted that many conventional hologram forming systems do not utilize cover plates but still have similar reflections from outer surfaces. A substrate 14 is positioned between the cover plates 10 and 12 and has a recording medium 16 fixed thereon which may be any suitable recording material such as dichromated gelatin when forming a phase type hologram or may be an amplitude type material. The spaces adjacent to the cover plates 10 and 12 are filled with suitable refractive index matching fluids 20 and 21 so that the rays such as laser rays are not reflected from the inner surfaces of the cover plates 10 and 12 or when entering the substrate 14 or the recording medium 16. Primary rays A and B of hologram forming beams are applied to the structure and first order reflections A' and B' result at a surface 22 of the plate 12. Second order reflections A" and B" are also formed but their intensity is reduced to a relatively low level.

Figure 2:
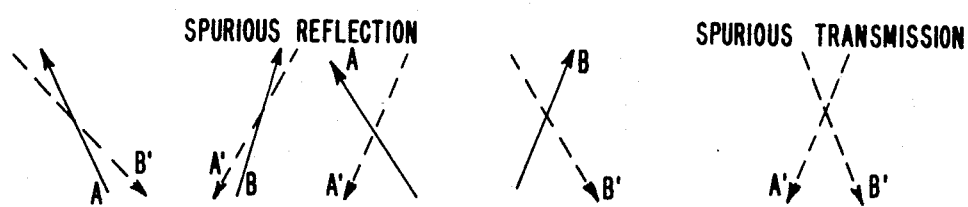
FIG. 2 is a schematic diagram showing the principle spurious transmission and reflection holograms formed by the structure of FIG. 1 without using the concepts of the invention.

Referring now also to FIG. 2, spurious reflection holograms from rays BB', AA', BA' and AB' will be formed at the recording medium 16 as a result of the surface reflections shown in FIG. 1. Other low intensity spurious reflection holograms are formed from ray combinations A'A", B'B", B'A", and A'B". Low intensity transmission holograms will be formed by rays A'B', A"A, B"B, B"A and BA". It is to be noted that even the intensity of spurious reflection holograms formed from higher order reflections such as A'B' are typically many times weaker than holograms formed from rays including a primary ray such as AB', A'B, BB' and AA'. Also the spurious transmission hologram formed from rays such as A'B' are typically many times weaker than the other holograms which are formed by interactions with one primary beam. Thus, although one of the systems of an embodiment of FIG. 5 of the invention does not eliminate the spurious holograms formed from the A'B' rays and some other higher order ray combinations, these beams do not substantially affect the hologram clarity. By eliminating all of the spurious holograms or all of the holograms which are combinations including at least one primary ray, only holograms from the desired primary beams A and B have a substantial efficiency.

Figure 3:
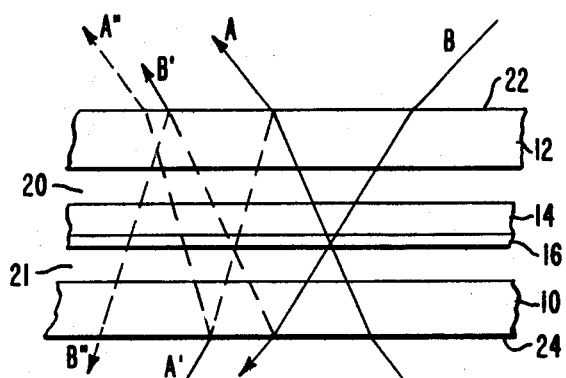
FIG. 3 is a schematic fragmentary side view of a portion of a reflection hologram forming structure for explaining the reflective beams or rays that are present to form spurious hologram recordings.

Referring now to the sectional view of FIG. 3, the same structure of FIG. 1 is shown having like reference numerals but with the beams directed to form a reflection hologram. The beams A and B are applied to the structure from opposite directions and a reflective beam A' is reflected from the surface 22 with reflective beam B' being reflected from a surface 24. Also formed are the second order reflections A" and B".

Figure 4:
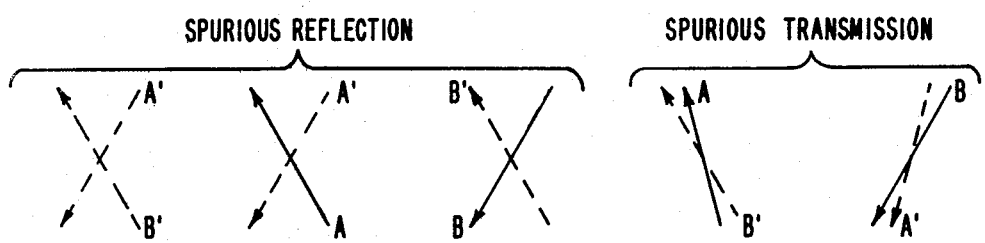
FIG. 4 is a schematic diagram showing the principle spurious transmission and reflection holograms formed by the structure of FIG. 3 without using the concepts of the invention.

Referring now also to FIG. 4, the spurious transmission holograms provided by the structure of FIG. 3 are developed by beams AB' and A'B. Other relatively weak spurious transmission holograms are formed from ray combinations AA", BB", A'B", B"A and A"B. The spurious reflection holograms from the same structure are caused by beams AA', BB' and A'B'. Similar to the discussion relative to FIG. 2, the holograms developed from two reflection beams A'B' are of a low-intensity and have a limited affect on a hologram recording. Other relatively weak spurious reflection holograms are formed from ray combinations A'A", B'B", A"B, AB" and A"B". It is to be noted that all spurious holograms resulting from any ray combinations except the two primary rays are eliminated by the two beam systems in accordance with the invention.

Referring now to FIGS. 5, 5a, 5b and 5c which show a system for forming a transmission hologram with all spurious recordings substantially eliminated by moving the reflective surfaces, a recording structure 29 includes outer cover plates 30 and 32 which are illustrated as having curved surfaces, the outer surfaces being respective surfaces 34 and 36. The cover plates 30 and 32 are connected by suitable sealing bellows 38 and 39 for retaining refractive index matching fluid or oil 42 and 43 in the optical path and around a recording medium 48 so that the recording structure is index matched to prevent reflections from inner surfaces. Mounted fixedly between the cover plates 30 and 32 by a fixed mounting ring 49 is a substrate 46 with the recording medium or film 48 attached to the bottom surface thereof. The recording medium 48 may be any suitable type of recording material such as a dichromated gelatin if a phase hologram is being formed or may be an amplitude type material such as silver halide. The cover plate 30 is solidly attached by methods such as gluing to a mounting ring 55 on which suitable transducers such as piezoelectric cylinders 50, 52 and 54 and a fourth piezoelectric cylinder 55 (FIG. 6) are attached thereto. The piezoelectric cylinders have their bottom surfaces attached by methods such as gluing to a suitable fixed mounting structure. Similarly, the cover plate 32 is fixedly attached to a mounting ring 57 on which four piezoelectric cylinders including cylinders 56, 58 and 60 are attached thereto. The piezoelectric cylinders, such as 56, 58 and 60, have their top surfaces attached to the fixed mounting structure 55. Both of the cover plates 32 and 30 move in opposite directions, respective distances $\Delta_1$ and $\Delta_2$ during the recording of a hologram as indicated by dotted surfaces 61 and 59. This motion removes spurious hologram recordings including those from higher order rays.

The laser wavefront applied to the recording structure 29 is provided by a laser 64 which applies a beam to a beam splitter 68 which may be a semi-reflective mirror that transmits one-half of the received energy and reflects one-half of the received energy. The reflected beam is applied from the beam splitter 68 to a mirror 66 and is then reflected to a mirror 70 which reflects the beam to a spatial filter 72 which as is well known in the art includes a lens and structure with an opening of a selected size. Suitable optics (not shown) are provided so that the beam has a wavefront that may be spherical, for example, to match the curvature of the cover plates 30 and 32. The beam is then applied to a phase shifter 76 which is illustrated as the global phase shifter in accordance with the principles of the invention. The phase shifter 76 includes two windows 78 and 80 respectively mounted to mounting rings 79 and 83. Four transducers such as piezoelectric cylinders 81, 82 and 84 are attached to the top surface of the mounting ring 83 and the piezoelectric cylinders have their upper end attached to the mounting ring 79. The mounting ring 83 is mounted to a fixed structure. An index matching fluid 89 is contained between the windows 78 and 80 by a sealing bellows 91. The curvature of window 78 is chosen so that the angle of each ray transmitted through window 78 is equal to the angle of incidence at the outer surface of the cover plate 32. The window 78 simultaneously moves in the opposite direction as the cover plate 32 as indicated by a dotted surface 88 so as to provide $\Delta_3$ movement to correct the phases of the primary beams as a function of the refractive index and distance of movement of the window 78.

The laser beam transmitted through the beam splitter 68 is reflected from the surface of a mirror 102 to a spatial filter 104. It is to be understood that the two laser beam path lengths, in the system of FIG. 5 and in the other illustrated systems, are matched within the restrictions of the coherence of the source or laser. The laser beam is then applied to a phase shifter unit 106 which is similar to the unit 76 except that, in some arrangements, the distance of movement $\Delta_4$ may be different than $\Delta_3$ and the curvature of the surfaces of the windows may be different than that of the phase shifter 76. The phase shifter 106 includes windows 108 and 110 shown having curved surfaces that are spherical. The window 110 is fixedly mounted to a mounting ring 109 and the window 108 is attached to a mounting ring 111. Four transducers which may be piezoelectric cylinders including cylinders 112, 114, and 116 are mounted between the mount rings 109 and 111 with the ring 109 being suitably mounted to a fixed structure. An index matching fluid 113 is retained between the windows 108 and 110 by a sealing bellows 115. Laser rays A and B are shown passing from the phase shifter unit 106 to the recording structure 29 and laser rays C and D are shown passing from the phase shifter unit 76 to the recording structure 29. Additional rays of the laser beams are not shown for convenience and clarity of illustration.

Control of the piezoelectric cylinders attached to the cover plates 30 and 32 is provided by a ramp generator 120 which applies a ramp voltage signal of a waveform 126 to an amplifier 122 and in turn to a lead 124. It is to be noted that the ramp generator 120 may provide signals with other configurations such as a triangular waveform. Also, the period of recording may cover a portion or several cycles of phase change. The lead 124 is coupled to the piezoelectric cylinders including cylinders 50, 52, 54, 56, 58 and 60 to simultaneously move the lenses 30 and 32 in opposite directions. Also, the lead 124 is coupled to the four piezoelectric cylinders including cylinders 81, 82 and 84 of the phase shifter unit 76 to insure that the substrate 48 receives the primary recording beam at a constant phase from one phase shifter. All of the piezoelectric cylinders have a ground or reference voltage connection (not shown).

The phase shifter unit 106 is controlled to insure that the recording medium 48 receives the rays such as A and B corrected for the movement of the cover plate 32 and is slaved to the reference phase variation of the phase shifter 76 by an interferometer system. A beam splitter 130 in a glass structure 131 is mounted between the substrate 46 and the cover 30 to combine beams B and D. Only two rays shown as B and D are applied to the beam splitter 130 with the two rays splitting and after mixing being applied to mirrors 132 and 134, each respectively receiving rays D and B' (a reflected ray) and rays B and D' (a reflected ray). The mixed signals DB' and BD' are respectively applied to detectors 140 and 142 and the output signals of each detector varies with the product of the mixed signals as they vary in phase. A differential amplifier 146 receives the signals from the detectors 140 and 142 and provides a difference signal that follows the phase modulation provided by the phase shifter 76. The difference signal is applied from the differential amplifier 146 through a high-voltage amplifier 148 to a lead 150 which in turn is coupled to the four piezoelectric cylinders of the phase shifter 106 including cylinders 112, 114 and 116. The slaving of the phase shifter unit 106 to the phase shifter unit 76 has the advantage that variations in the characteristics of the piezoelectric cylinders and the driving ramp voltage received by different cylinders is compensated.

Figure 6:
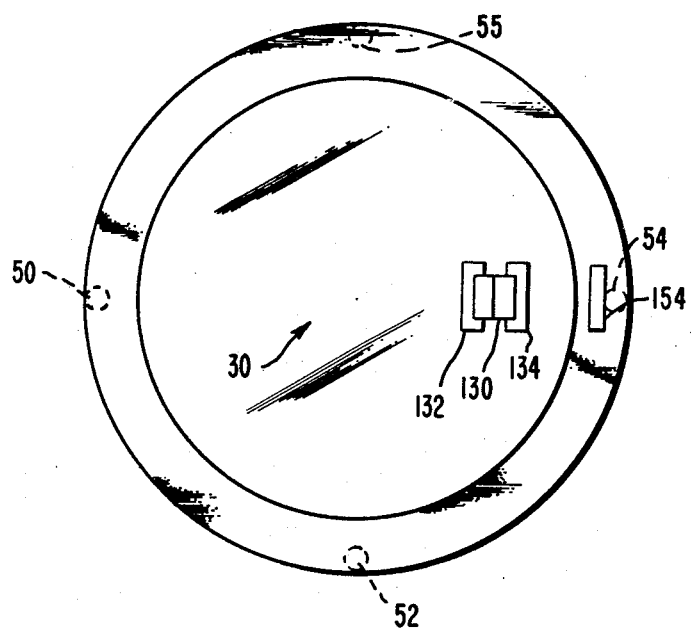
FIG. 6 is a sectional view taken at lines 6—6 of FIG. 5 for further explaining the recording system in accordance with the principles of the invention.

Referring now also to FIG. 6 which shows a section taken below the recording medium 48, a window 154 is shown through which the mixed beams pass to the detectors 140 and 142. The mounting ring 57 is also changed in configuration at the window 154 so that the detectors 140 and 142 of FIG. 5 receives the mixed beams.

Referring now also to FIG. 7 which is a sectional view of the phase shifter 76, a piezoelectric cylinder 85 is shown and the phase shifter may utilize the same number of piezoelectric cylinders as is utilized in the recording structure 29.

Figure 5:
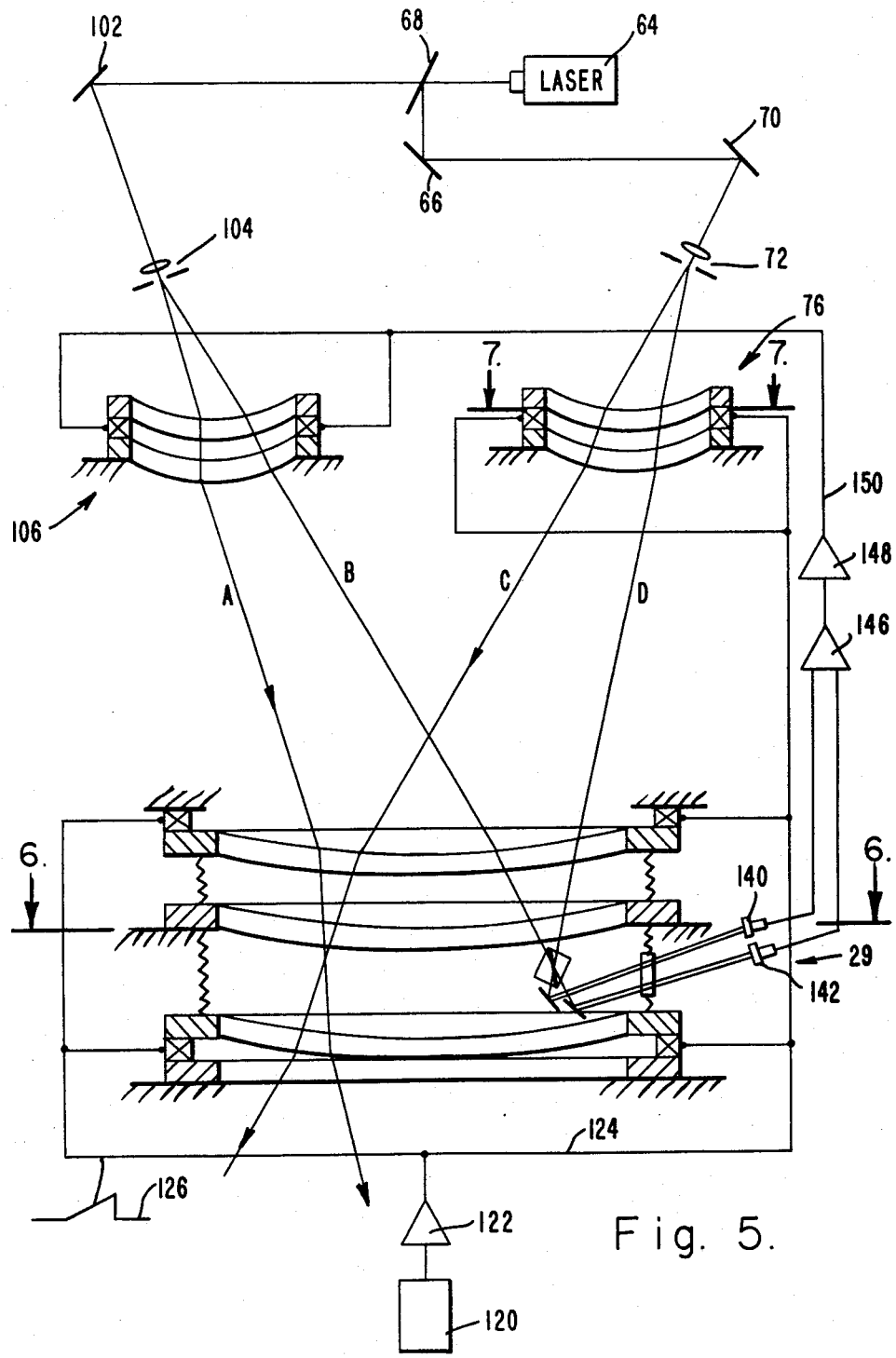
FIG. 5 is a schematic sectional view of a system for forming a transmission hologram with all reflective surfaces of the hologram recording structure being controlled to move and operating either with or without global phase shifters, all in accordance with the principles of the invention.
Figure 5A:
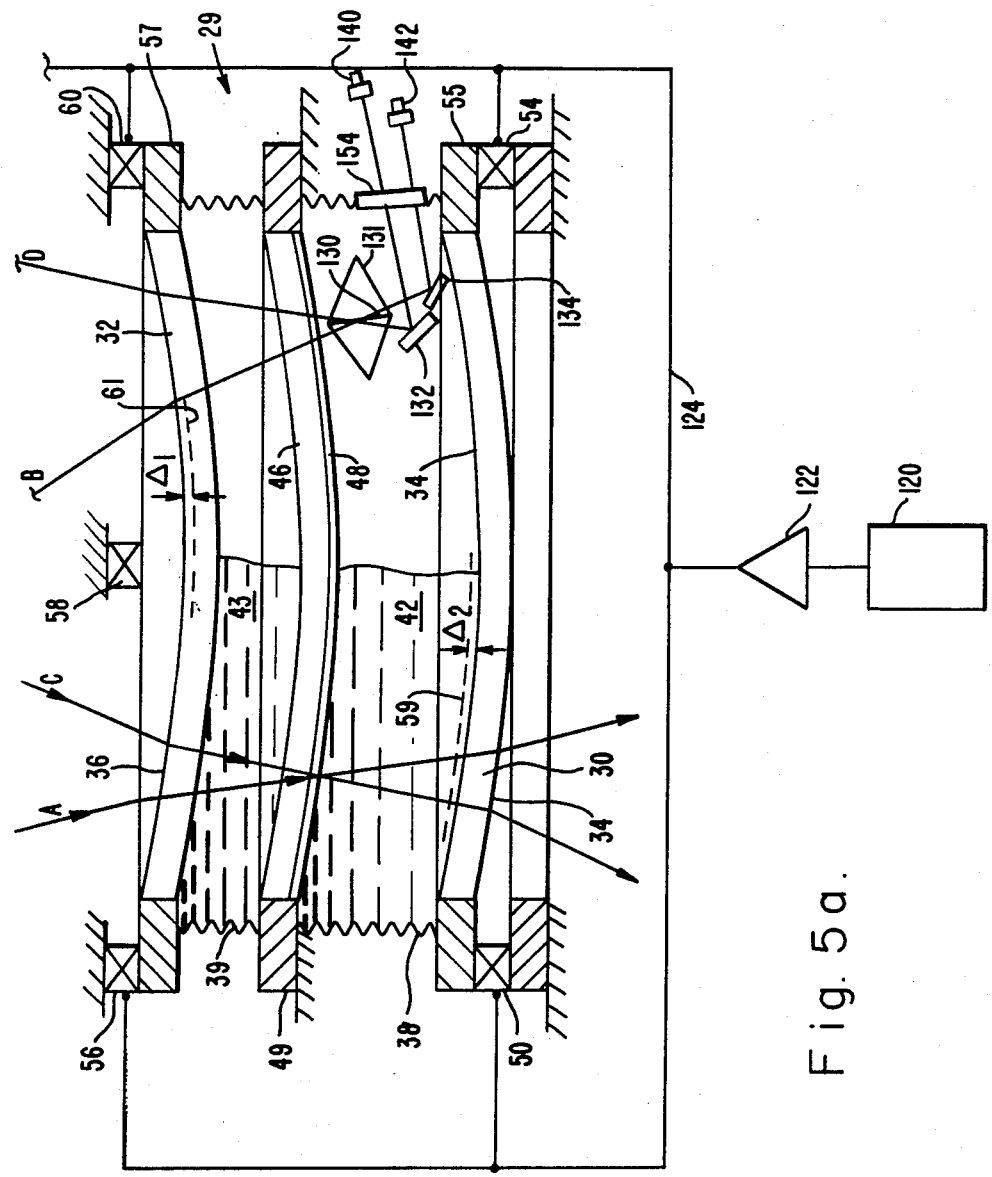
FIGS. 5a, 5b, and 5c are enlarged sectional views showing portions of the system of FIG. 5.
Figure 5B:
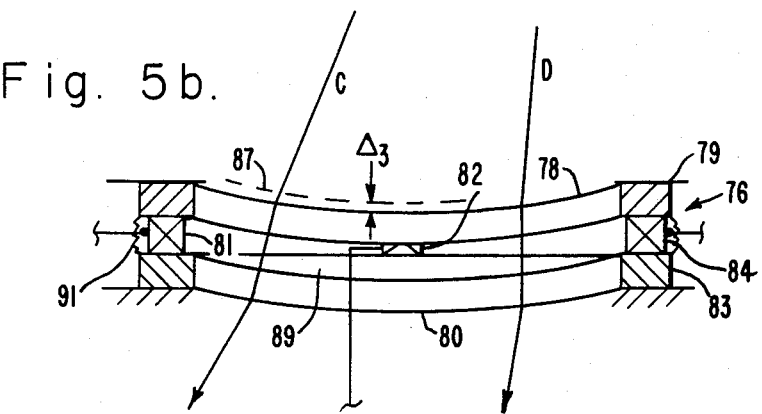
Figure 5C:
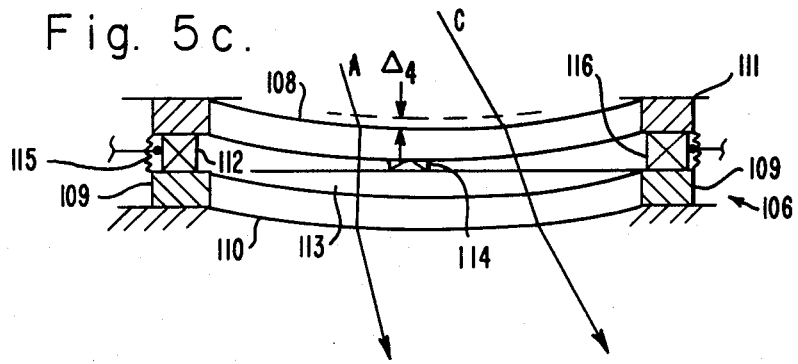
Figure 9:
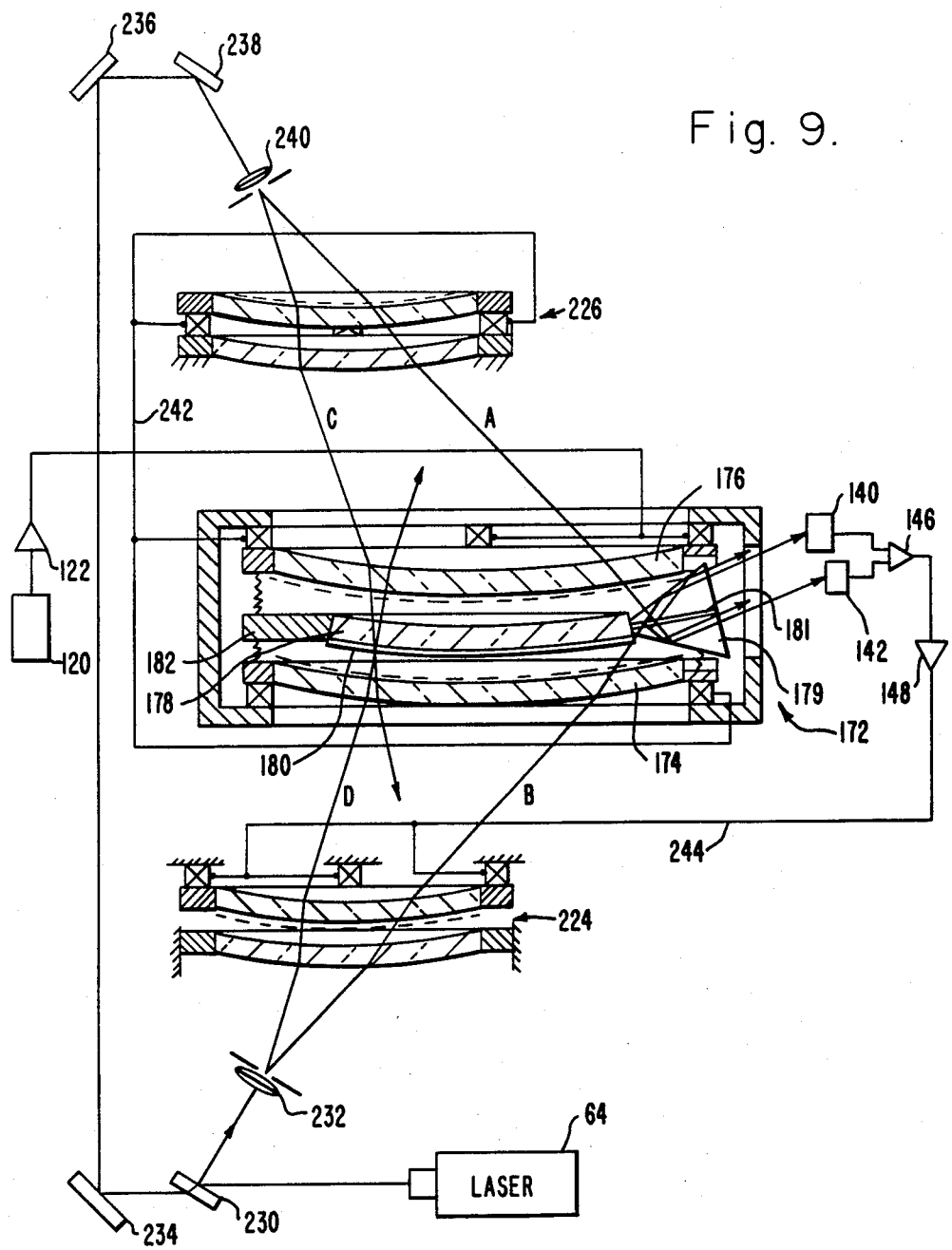
FIG. 9 is a schematic sectional view of a system for forming a reflection hologram with all of the reflective surfaces of the recording structure moving and including global phase shifters, all in accordance with the principles of the invention.
Figure 9A:
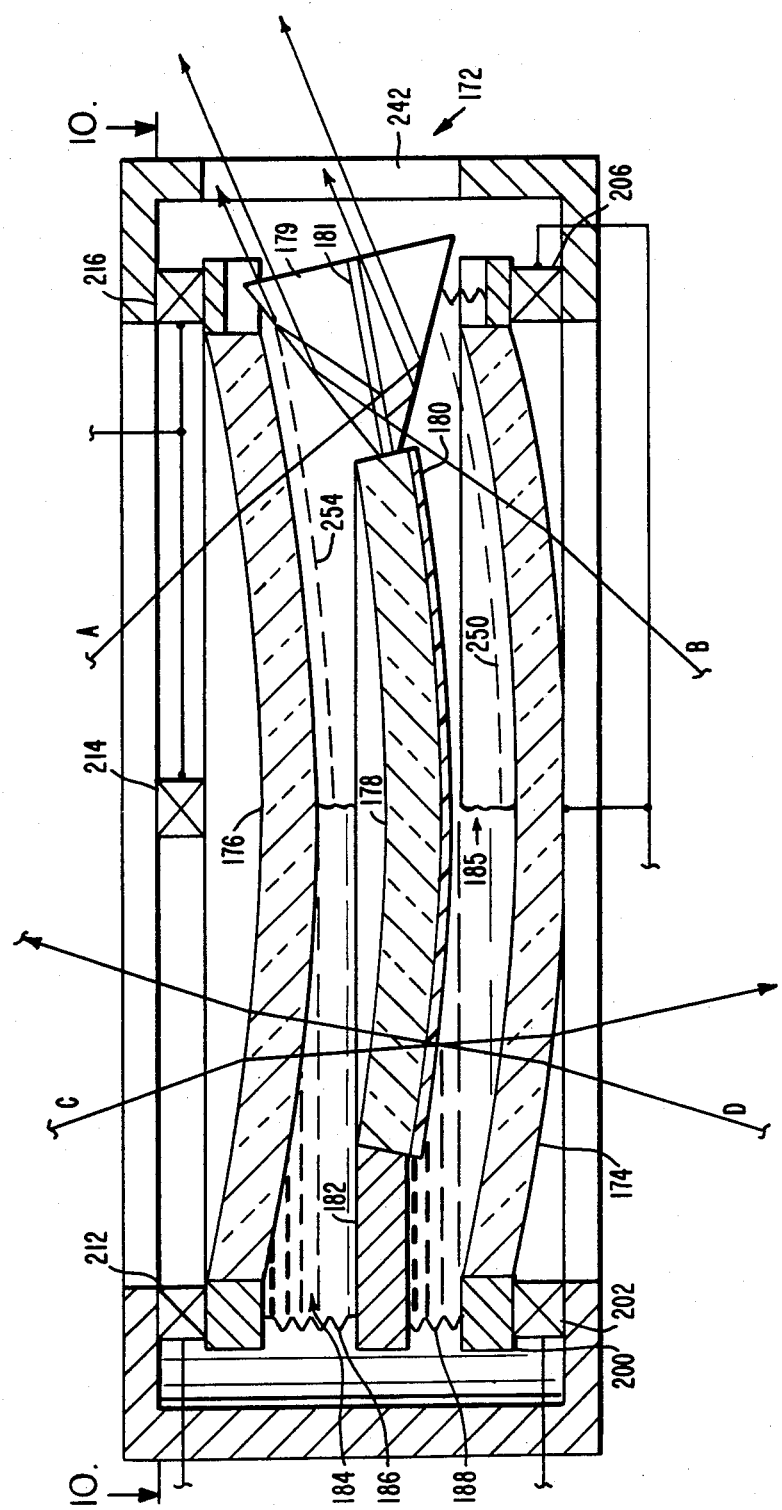
FIGS. 9a, 9b and 9c are enlarged sectional views showing portions of the system of FIG. 9.
Figure 9C:
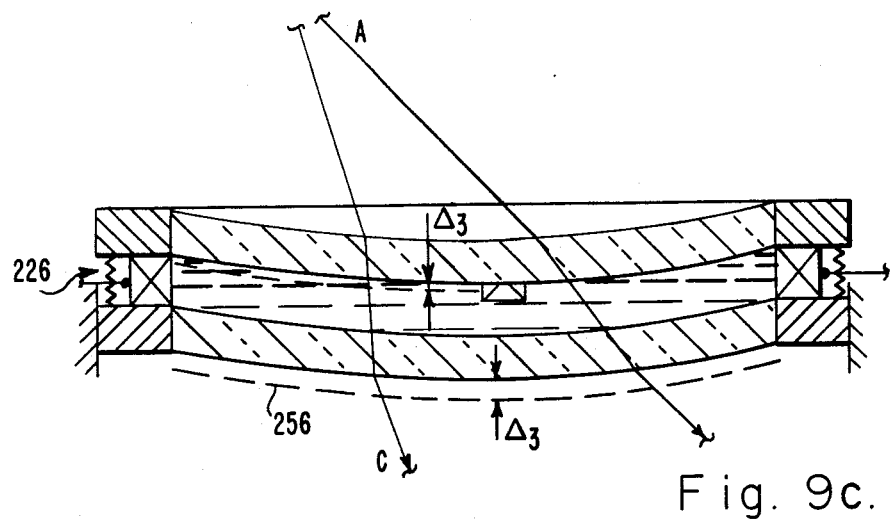
Figure 9B:
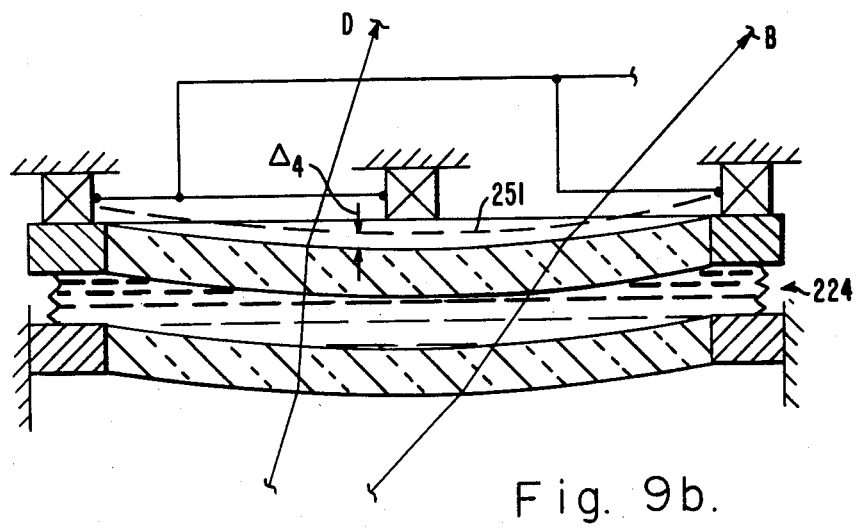

In the operation of forming a hologram by the system of FIG. 5, the wavefronts including rays A and C are applied to the recording medium 48. In response to the ramp voltage of the waveform 126, the cover plates 32 and 31 move distances $\Delta_1$ and $\Delta_2$ one or more times during the illustrated continuous recording process so that the phases of the primary beams A and C change about one or more one-half wavelengths during the recording period, this period being a function of the sensitivity of the recording medium. The distances $\Delta_1$, $\Delta_2$, $\Delta_3$ and $\Delta_4$, are equal in the illustrated system but the distance $\Delta_2$ and rate of motion of plate 30 may be at a different frequency within the scope of the invention. Typical film recording times are between nanoseconds and hours with the ramp voltage of the waveform 126 extending over this period. The reflected waves from a surface 34 have a total phase shift of about $2 n\Delta_3$ during the recording period if the phase shifters are not present where n is the refractive index of the index matching fluid. Because the continuous shift of the primary rays such as A and C decreases the intensity of the primary hologram recordings, the global phase shifters 76 and 106 operate to eliminate the phase shift of the primary beam so that the rays are maintained at a constant relative phase by decreasing or increasing the path length as a result of the movements $\Delta_3$ and $\Delta_4$ in the refractive index material while the path length in the recording structure 29 is respectively increasing or decreasing. The net result is to maintain the phase relationship of the rays of the two primary beams while varying the phase of the reflective rays. This continuous change of phase relationships between the primary beams and the beams reflected from the outer surfaces of cover plates 30 and 32 prevents the formation of spurious hologram recordings having sufficient intensity to affect the final hologram display.

To explain the $\Delta$ movements, the $\Delta_1$ and $\Delta_2$ movements during an exposure period may be selected as being equal and the phase shifters from this movement is partly cancelled by the movement of the phase shifters 76 and 106. The phase shift of ray A at the surface 108 due to the motion $\Delta_4$ is $(1.515-1.0)\Delta_4$ or $0.515\Delta_4$, where 1.515 is the index of refraction, for example, of a particular glass and 1.0 is the index of refraction of air. The phase shift of ray A at the outer surface of the cover plate 32 to maintain the ray at a constant phase at the film 48 is $(1.515-1.0)\Delta_1$ or $0.515\Delta_1$. It is to be noted that $\Delta_1$ is equal to $\Delta_4$ and similarly $\Delta_3$ is equal to $\Delta_1$. The phase shift of the reflected ray A' at the surface 34 is approximately $(1.515\times2)\Delta_2$ or $3.03\Delta_2$ and this is also the phase shift of the ray C' at the film 48. Thus, it can be seen that if $\Delta_1$, $\Delta_2$ and $\Delta_4$ are equal the reflected vector A' has a phase shift difference from the fixed phase ray A of approximately $3.03\Delta_2$ thus preventing spurious holograms. All of the delta values are the displacement of the respective moving surfaces along the vertical axis of FIG. 5. It is to be noted that the actual phases along the rays is also a function of the ray angle as well as the vertical displacement but, for ease of understanding, this parameter has not been considered in the above discussion.

The system of FIG. 5 as shown also cancels all spurious holograms that would be formed from all combinations involving any reflective ray or rays because of the movement of the plate 32. The desired hologram in the systems of the invention is the hologram formed by interference between primary rays. If it is desired to only eliminate spurious holograms from combinations of the primary and any reflection rays, the cover plate 32 may be maintained stationary by disconnecting the lead 124 from the piezoelectric cylinders such as 56, 58 and 60 and by removing the phase shifters 106 and 76. Thus, only cover plate 30 is moving during the exposure period. This simplified arrangement in accordance with the invention provides a transmission hologram that is satisfactory for many uses. It is to be noted that with the cover plate 32 stationary and the phase shifters removed, the relative phase at the recording medium 48 between o the fixed phase ray A and the reflected ray A' varies by $3.03\Delta_2$ when the refractive index is that of glass (typically 1.515).

To further explain the correspondence of angles of each ray between the phase shifter unit and the cover plate 32, reference is now also made to FIG. 8 which is a fragmentary side view of a typical global phase shifter and a portion of the recording structure. In order to lock the phases of the primary exposure beams in the system of FIG. 5, a compensation must be provided for the global variation in path lengths in the entire wavefront. Path length variations occur as a result of the motion of the cover and are a function of the path angle through the moving cover plate 32. A global phase shifter 160 is shown having windows 162 and 164 with an index matching fluid therebetween and with flat surfaces for ease of explanation, but the concept is the same for curved surfaces as shown in FIG. 5. The rays A and C are applied to a flat cover plate 166 and in turn through an index matching fluid 167, substrate 168 and a recording medium or film 170. The two rays A and C pass through the moving cover plate 166 at different angles $\theta_A$ and $\theta_C$. In systems in accordance with the invention where the substrate moves the phase shifter angle must equal the angle at the recording medium which is the surface that moves. It is to be noted that by moving the cover plate 166 a distance Δ, the path length change for each ray is different since it depends inversely on the cosine of $\theta$. Thus, in order to maintain the phases of the main exposure beams locked, the phase shifter 160 must correct the phases of each ray in the inverse ratio of cosine of $\theta$. The phase shifter 160 is a liquid index matched structure with a surface and refractive index that substantially matches the cover plate 166. It is to be understood that if a different refraction index were utilized in the phase shifters in the systems of the invention, the curvatures of the phase shifters and the cover plates would be varied accordingly. Thus, the angle for each ray passing through the phase shifter 160 corresponds to the angle for each ray passing through the moving cover plate 166 or the moving recording medium in systems of the invention where the substrate is controlled to move. By selecting the surface curvature, the rate of movement of the window 162 and the distance to the focal point at the spatial filter 104, the phase shifter 160 automatically adjusts each ray in proportion to its own inverse cosine function so that the path length compensation over all of the surface of the cover plate 166 is of the proper amount. Thus, a requirement for designing the phase shifter is that the angles for each ray must be the same at the phase shifter and at the cover plate. Accordingly, the global phase shifter 160, in accordance with the invention, corrects the phase of each of the main beams so that each ray is at a constant phase and so that the two beams maintain their relative phase relationship while the moving cover plate 166 changes the phase of the reflected beams relative to the main or primary beams to prevent formation of spurious hologram recordings. The operation of the phase shifters shown in all of the systems in accordance with the invention is the same as explained relative to FIG. 8.

Referring now to FIGS. 9, 9a, 9b, 9c and 10, a system is shown for forming reflection holograms utilizing two laser beams and preventing the formation of all spurious hologram recordings that could be formed from first and higher order reflections by moving both of the cover plates during the recording period. A recording structure 172 includes cover plates 174 and 176 positioned on opposite sides of a substrate 178 having a recording medium or film 180 attached to the lower surface thereof for example. At one position of the substrate 178, a beam splitter prism 179 is attached having a beam splitting coating 181 at the center thereof for providing a mixing action so that one of the phase shifters can be controlled. The substrate 178 is attached to a fixedly positioned mounting ring 182 and the spaces between the cover plate 174 and the recording medium 180 and between the substrate 178 and the cover plate 176 are filled with index matching fluids 184 and 185, being contained by sealing bellows 186 and 188. The cover plate 174 is attached to a ring 200 which in turn is attached to transducers shown as piezoelectric cylinders 202, 204 and 206 and a fourth piezoelectric cylinder (not shown). The bottom of the piezoelectric cylinders attached to the ring 200 are fixedly attached to a suitable mounting structure. The cover plate 176 is attached to a mounting ring 210 which in turn is attached to transducers shown as piezoelectric cylinders 212, 214, and 216 and a piezoelectric cylinder 220 shown in FIG. 10.

The system includes global phase shifters 224 and 226 which are similar in structure and function as explained relative to FIGS. 5 and 8 except that they are positioned so that the direction of curvature of the windows match the direction of curvature of the respective cover plates 174 and 176. The laser 64 applies a beam to a beam splitter 230 which reflects the beam to a spatial filter 232, the beam having passed through suitable optics (not shown) for forming a phase front of a desired configuration such as a spherical phase front in the illustrated system. The beam is then applied through the phase shifter 224 through the cover plate 174, the index matching fluid 185, and to the recording medium 180 as one of the primary recording beams.

The beam transmitted through the beam splitter 230 is reflected in turn from the surface of mirrors 234, 236 and 238 to a spatial filter 240. The beam has a wavefront as provided by suitable optics (not shown). The beam then passes through the phase shifter 226 through the cover plate 176, index matching fluid 184, substrate 178 and the recording medium 180 as the second primary recording beam. The phase shifter 224 and 226 have top cover plates that move respective distances $\Delta_4$ and $\Delta_3$ to the positions of respective dotted lines 251 and 256.

The ramp generator 120 applies a ramp voltage, for example, through the amplifier 122 and through a lead 242 to the piezoelectric cylinders 202, 204, 206, 212, 214 and 216 and to the two cylinders not shown but attached to the rings 200 and 210. Also the lead 242 is coupled to the four piezoelectric cylinders provided in the phase shifter 226. The phase shifters 226 and 224 move to maintain the phases of the primary beams while the cover plate 176 moves during the recording process.

Figure 10:
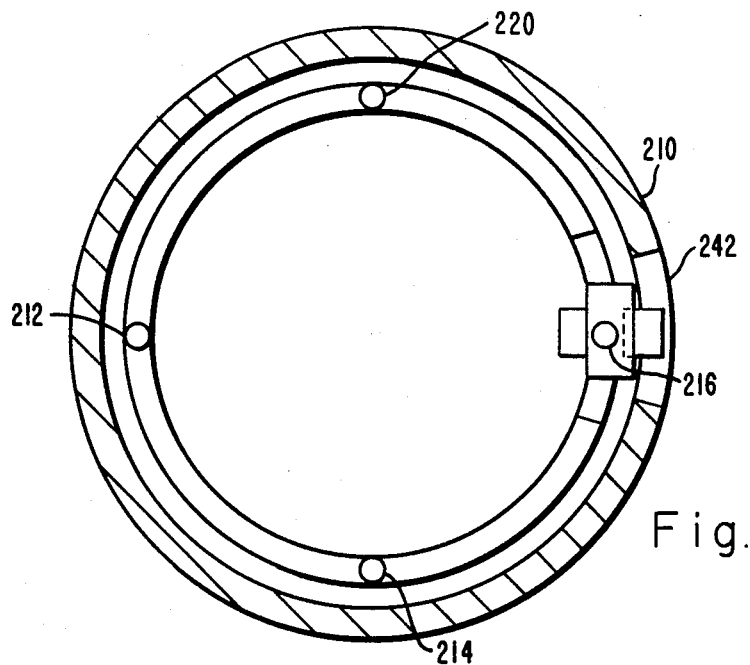
FIG. 10 is a schematic top view taken at lines 10—10 of FIG. 9 for further explaining the structure of the recording system.

In order to slave the phase change of the primary beam passed through the phase shifter 224, beams A and B are applied to the beam splitter prism 179 so that each reflects and passes through the beam splitting coating 181. A window 242 is provided as shown in FIG. 10 to pass two mixed rays to detectors 140 and 142, which in turn applies signals to the differential amplifier 146 and high voltage amplifier 148, which elements were described relative to FIG. 5.

The beam splitter 181 forms a Michelson interferometer that compares the phase of transmitted beam B with a reflected beam A' at the detector 140. The beam splitter 181 also compares transmitted beam A with reflected beam B' at the detector 142. The output signals of the detectors 140 and 142 are proportional to the difference in phase of the beams A and B in the plane of the substrate 180 and a difference signal is provided at the output of the differential amplifier 146. The signal at the output of the amplifier 148 is applied through a lead 244 to the four piezoelectric cylinders of the phase shifter 224 so that the path length variation is slaved to the path length variation of the phase shifter 226 and the two cover plates. It is to be noted that each piezoelectric cylinder also has a reference voltage connected thereto as is well known in the art. In operation, the cover plates 174 and 176 move during the recording process and the primary beams are maintained with a constant relative phase at the plane of the recording medium 180 so that the primary hologram has a high efficiency. When the cover plate 174 moves upward as indicated by a dotted line 250, the surface of the phase shifter 224 moves upward as shown by the dotted line 251 to compensate the path length change of the main beam. Similarly, when the cover plate 176 moves downward as indicated by the dotted line 254, the surface of the phase shifter 226 moves downward as shown by the dotted line 256 to compensate the path length change of the main beams. Thus, a constant relative phase is maintained between the two main holographic forming beams.

The cover plates 174 and 176 may be set to move in equal and opposite directions $\Delta_1$ and $\Delta_2$. Rays from the spatial filter 240 represented by A and C experience an approximate phase variation through the phase shifter 226 of $(1.515-1.0)\Delta_3$ or $0.515\Delta_3$ considering that the index of refraction is that of glass or 1.515 for example. The phase shift of these same rays A and C due to motion of the cover plate 176 will be approximately $(1.515-1.0)\Delta_2$ or $0.515\Delta_2$. When $\Delta_3$ is equal to $\Delta_2$ the rays A and C from spatial filter 240, will be of constant phase at the film surface. Ray C' reflected from the surface 174 will see a phase variation of approximately $\Delta_1(1.515)2$ or $3.020\Delta_1$ relative to the constant phase of the primary rays at the film surface. In a similar manner as outlined above, the rays from spatial filter 232 will be of a constant phase at the recording surface when $\Delta_4$ is equal to $\Delta_1$. In addition, the reflection of rays B and D, or B' and D', will be constantly varying in phase by approximately $(1.515)2 \Delta_3$ during the hologram recording. It is to be noted that all the primary rays remain in phase at the film plane while the first and higher order reflections are of constantly varying phase and are therefore eliminated. The system of FIG. 9 cancels spurious holograms that could be formed from all combinations involving any reflective ray or rays.

Figure 11:
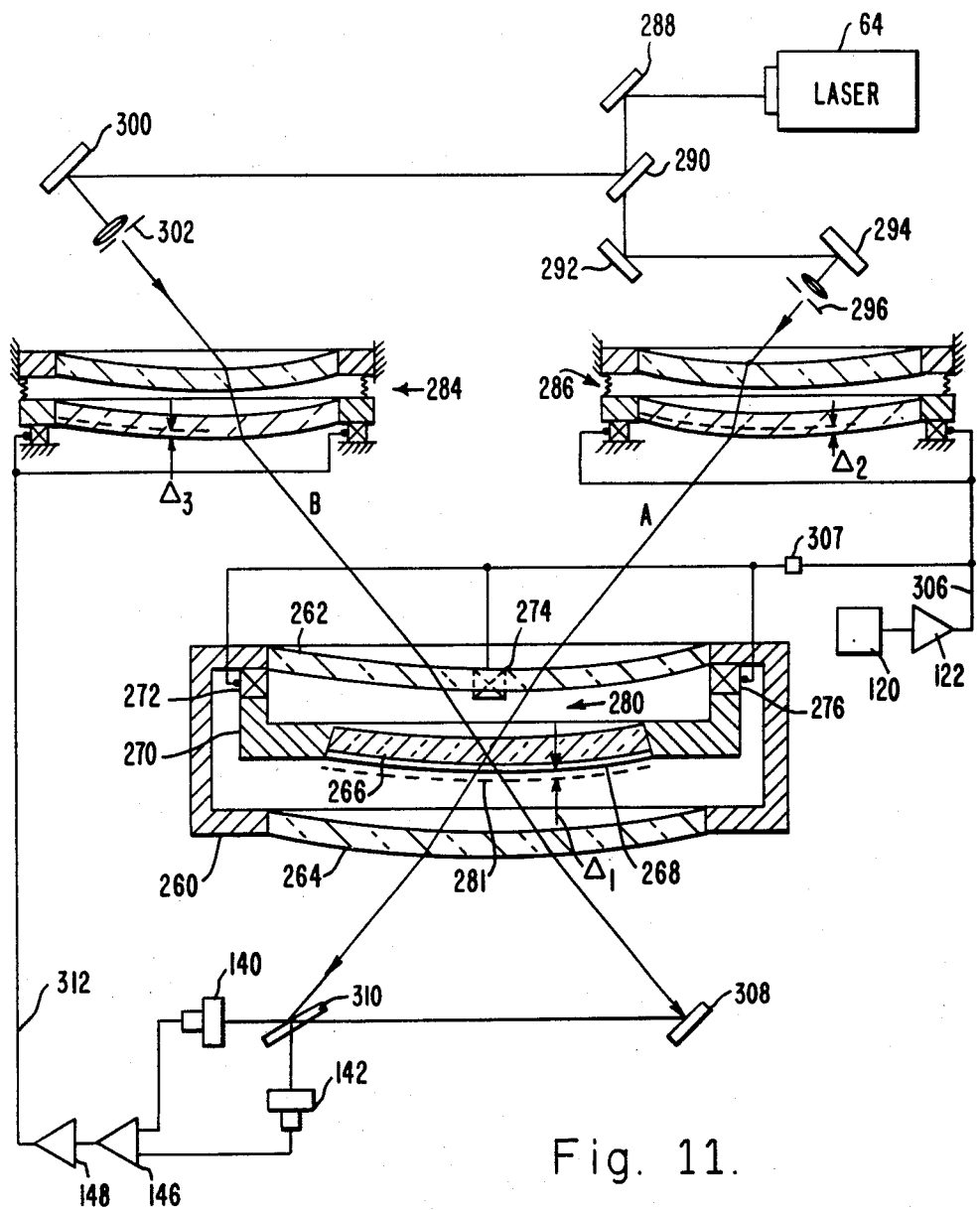
FIG. 11 is a schematic sectional view of a system for forming a transmission hologram with only the recording medium and substrate moving and including global phase shifters in accordance with the invention.
Figure 12:
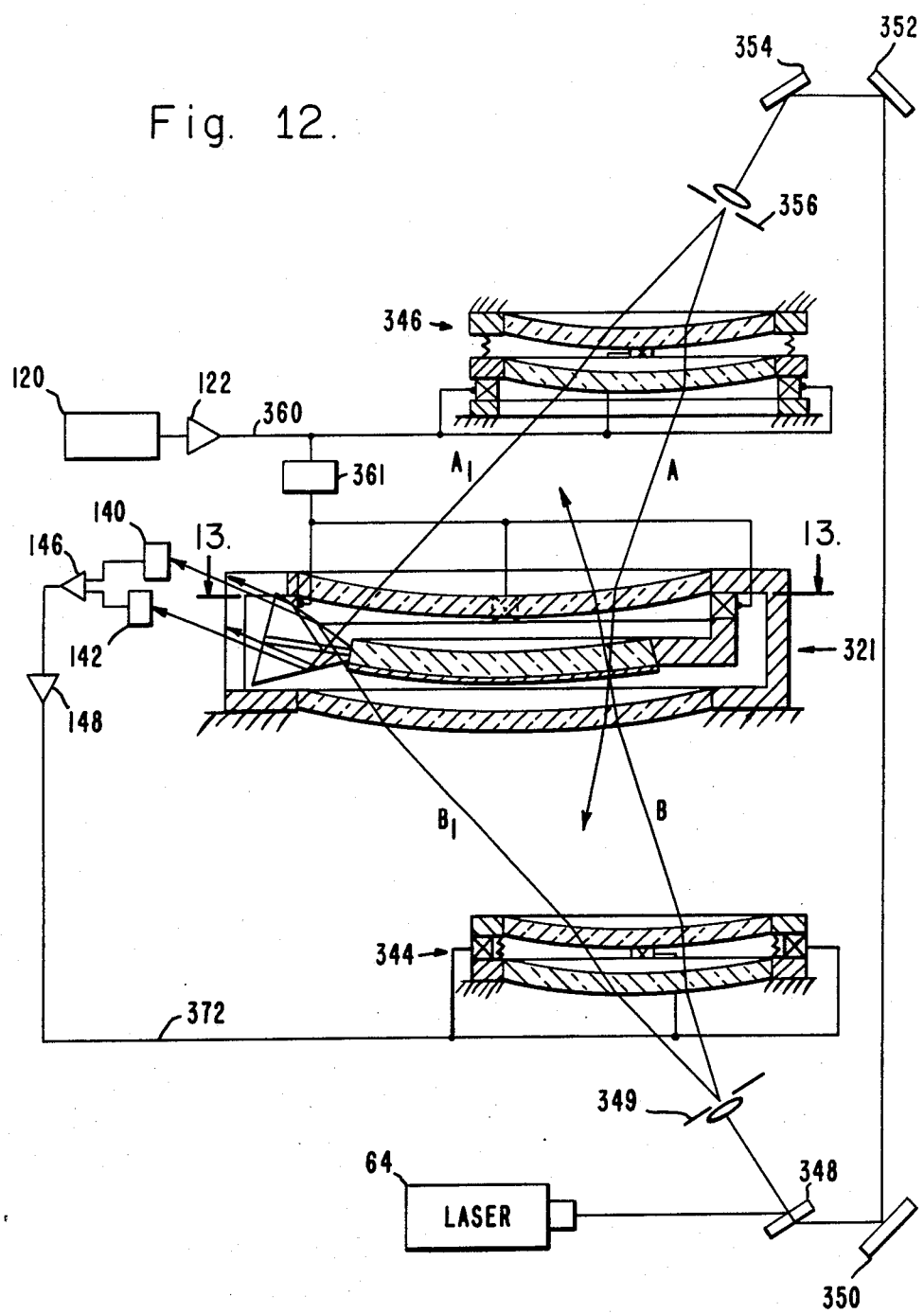
FIG. 12 is a schematic sectional view of a system for forming a reflection hologram with only the recording medium and substrate moving and utilizing global phase shifters in accordance with the invention.
Figure 12C:
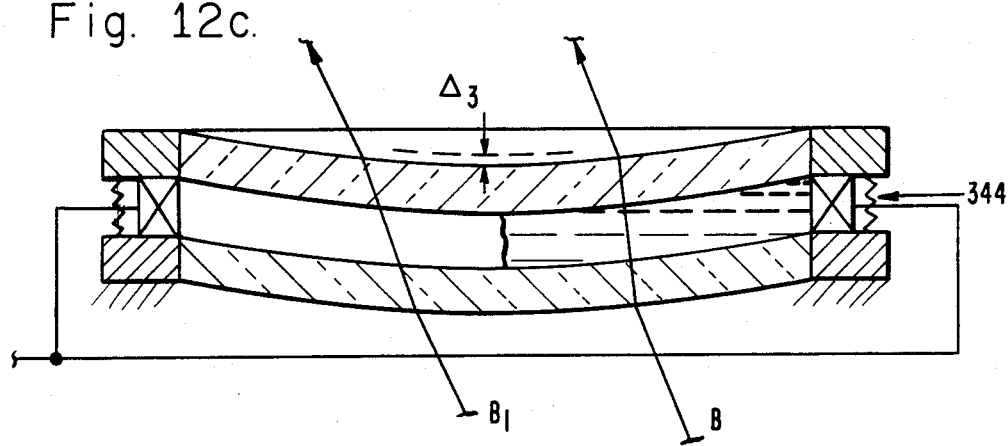
FIGS. 12a and 12b are enlarged sectional views of the recording structure and are global phase shifters of FIG. 12.

Referring now to FIG. 11, a system is shown for forming a transmission hologram utilizing two laser beams and moving the substrate and recording film during the recording process so as to eliminate spurious hologram recordings caused by any combinations of the primary ray with any surface reflections or any combination of surface reflections. A circular mounting structure 260 is provided to hold cover plates 262 and 264 in a fixed position. A substrate 266 is provided with a recording medium 268 on the lower surface thereof with the substrate 266 being attached or glued to a circular mounting structure 270. Tranducers shown as piezoelectric cylinders 272, 274 and 276 and a fourth piezoelectric cylinder (not shown) are attached between the mounting structures 270 and 260. The system of FIG. 11 and other systems of the invention are not limited to using four cylinders or any motion devices but any suitable number may be utilized to move the substrate or the cover plates. An index matching fluid 280 is provided in the enclosure of the mounting structure 260. Global phase shifters 284 and 286, as discussed relative to FIG. 5 are provided to compensate the phase change of the two main beams indicated as rays A and B while the recording medium 268 continually moves during the recording period. The phase shifters in FIG. 11 as well as in FIG. 12 are designed so that the angle of the rays at the recording medium is equal to the angle of the same ray at the global phase shifter. The laser 64 applies a beam to a mirror 288 and in turn to a beam splitter 290 which transmits a beam in turn to a mirror 292, a mirror 294 and a spatial filter 296. The beam can be shaped with a desired phase front between the beam splitter 290 and the spatial filter 296 by suitable optics (not shown). The beam having a spherical configuration, for example, is passed through the phase shifter 286, through the cover plate 262 to the recording medium 268 and on through the cover plate 264 as indicated by the ray A. The beam reflected from the beam splitter 290 is applied to a mirror 300 which reflects the beam to a spatial filter 302. The beam after being shaped with the desired phase front passes through the phase shifter 284, passes through the cover plate 262 to the recording medium 268 and then passes on through the cover plate 264 as indicated by the ray B. The substrate 266 moves a distance $\Delta_1$ to the position of a dotted line 281 and the bottom windows of the phase shifters 286 and 284 moves distances $\Delta_2$ and and $\Delta_3$. As previously discussed, all of the piezoelectric cylinders in the system of FIG. 11 are also coupled to a source of reference potential (not shown).

The ramp generator 120 applies a ramp voltage through the amplifier 122 and a lead 306 and through a voltage divider 307 to the four piezoelectric cylinders 272, 274, 276 and the one not shown to provide the changing phase of the first and higher order reflective rays. Also, the lead 306 is directly coupled to the four piezoelectric cylinders of the phase shifter 286. In order to control the phase shifter 284, the ray B is passed to a mirror 308 and reflected to a beam splitter 310 so that beams are applied to both the detectors 140 and 142 as explained relative to FIG. 5. The ray A is passed from the cover plate 264 directly to the beam splitter 310 to provide beams to both the detectors 140 and 142. The detector 140 compares the phase of transmitted beam B with reflected beam A' and the detector 142 compares the phase of transmitted beam A with reflected beam B'. A signal proportional to the difference in phase of rays A and B is developed in the differential amplifier 146 and applied through the amplifier 148 and through a lead 312 to the four piezoelectric cylinders of the phase shifter 284.

The total phase shift of ray A, for example, at the bottom surface of the phase shifter 286 is approximately $(1.515-1)\Delta_2$ or $0.515\Delta_2$ and the total phase shift of the ray A at the recording medium 268 is approximately $1.515\Delta_1$. Thus, $\Delta_2$ is approximately equal to $3\Delta_1$, and the total displacement $\Delta_2$ of the lower window of the phase shifter 286 must be approximately 3 times the total displacement $\Delta_1$. Also, the total displacement $\Delta_3$ of the lower window of the phase shifter 284 is approximately 3 times the total displacement $\Delta_1$. The reflected rays A' and B' have a $-3.03\Delta_1$, or $-\Delta_2$ phase variation at the film 268 relative to the fixed phase of the primary rays A and B to prevent formation of spurious holograms. This phase shift discussion does not consider the angle of the rays relative to the vertical axis of the illustrated system.

In operation, when the recording medium 268 moves downward the distance $\Delta_1$ during the recording period or a portion of the recording period, as indicated by the dotted surface 281, the lower cover plates of the phase shifters 286 and 284 move upward to maintain a constant relative phase between the two beams and to maintain each ray at a fixed phase. Thus, by moving three elements a high intensity transmission hologram is formed without spurious hologram recordings being formed from reflections. The system of FIG. 11 eliminates spurious hologram recordings caused by all combinations involving any reflected ray or rays.

Figure 13:
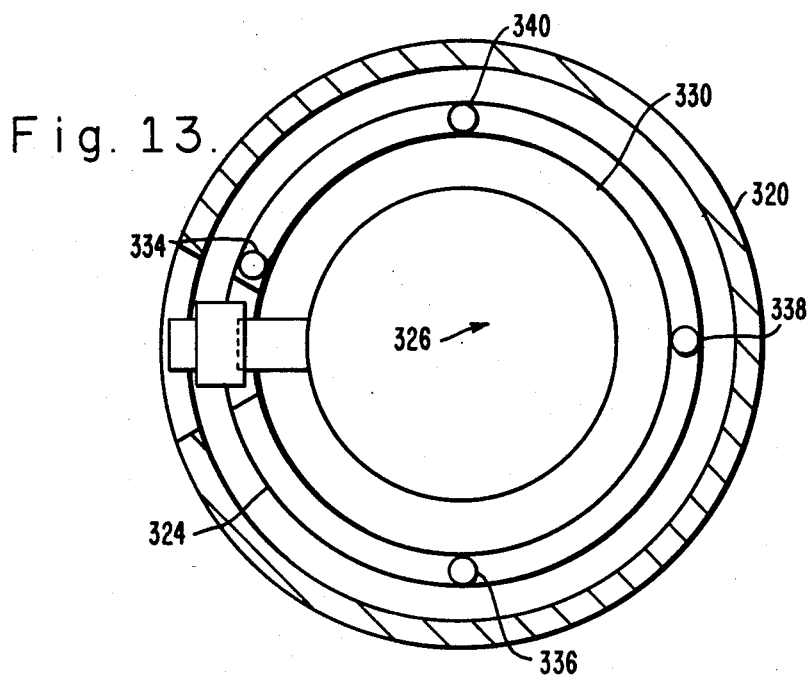
FIG. 13 is a schematic sectional view taken at lines 13—13 of FIG. 12.

Referring now to FIGS. 12, 12a, 12b, 12c and 13, a system is shown for developing a reflective hologram and substantially eliminating all spurious hologram recordings by moving the substrate and the recording film. The system of FIG. 12 eliminates spurious hologram recordings caused by all combinations involving any reflective ray or rays. A circular mounting structure 320 of a recording structure 321 retains in a fixed position, a cover plate 322 and a cover plate 324 having selected curvatures. A substrate 326 having a recording medium or film 328 on the bottom surface, for example, thereof is movably positioned between the cover plates 322 and 324 and is attached to a circular mounting structure 330 also seen in FIG. 13. An index matching fluid 327 is maintained between the cover plates 322 and 324 by sealing bellows 329 and 331 to provide an index matched structure and prevent reflections from the inner surfaces. Transducers shown as piezoelectric cylinders 334, 336, 338 and 340 as shown in FIG. 13 are attached at the top to the mounting structure 320 and attached at the bottom to the mounting structure 330. The piezoelectric cylinder 334 is positioned as shown in FIG. 13 to avoid a window in the structure 320. Global phase shifters 344 and 346 are provided for varying the phases of the primary beams and each includes transducers shown as piezoelectric cylinders. The laser 64 applies a beam to a beam splitter 348 which reflects a beam through a spatial filter 349 and through the phase shifter 344 to the cover plate 322, the index matching fluid 327, the recording medium 328 and the cover plate 324. The beam may be shaped by suitable optics (not shown) between the spatial filter 349 and the phase shifter 344 to have a spherical wavefront, for example.

The beam transmitted through the beam splitter 348 is reflected in turn from the surfaces of mirrors 350, 352 and 354 and through a spatial filter 356. The beam may be shaped after the spatial filter 356 by suitable optics (not shown). The beam then passes through the phase shifter 346, the cover plate 324, the index matching fluid 327, the recording medium 328 and the cover plate 322.

For providing movement of the recording medium 328, the ramp generator 120 applies a ramp voltage, for example, through the amplifier 122 to a lead 360 which is coupled through a voltage divider 361 to the piezoelectric cylinders 334, 336, 338 and 340 (shown in FIG. 13). Also, the lead 360 is coupled to the four piezoelectric cylinders of the phase shifter 346 to provide a phase correction to the beam passing therethrough. Mounted to the end of the substrate 360 is a beam splitter prism 362 having a beam splitting coating 364 positioned in the center thereof. A window 370 is provided at the edge of the mounting structure 320 so that beams $A_1$ and $B_1$ after mixing to a first pair of beams $A'_1 B_1$ and a second set of beams $A_1 B_1'$ can reflect to the respective detectors 140 and 142. The generation of a difference voltage on a lead 372 is similar to that explained relative to FIG. 9 and will not be explained in further detail. The lead 372 is coupled to the four piezoelectric cylinders of the phase shifter 344 so that the phase correction thereat is slaved to the correction of the phase shifter 346. The total movements of the substrate 321, the bottom plate of the phase shifter 346 and the top plate of the phase shifter 344 are respectively $\Delta_1$, $\Delta_2$ and $\Delta_3$, and occurs in both directions and several times, for example.

In operation, the movement during the recording period of the recording medium 328 eliminates the recording of spurious holograms due to surface reflections. The operation of the global phase shifters 344 and 346 maintains the primary beams at a constant relative phase to provide a high efficiency hologram recording. The phase shift of the ray A, for example, not considering the ray angle, at the bottom surface of the phase shifter 346 and with the refractive index being that of a typical glass or 1.515 is $(1.515-1)\Delta_2$ or $0.515\Delta_2$ and the phase shift of the ray A at the recording medium 328 due to its motion $\Delta_1$ is $1.515\Delta_1$. Thus, the total displacement $\Delta_2$ of the phase shifter 346 must be approximately three times the displacement $\Delta_1$ of the substrate 326 to keep ray A at a constant phase at the recording medium and prevent the formation of spurious holograms. Also, the total displacement $\Delta_3$ of the phase shifter 344 is approximately three times the displacement of the substrate 326.

It is to be noted that the phase shifters 344 and 346 move in the same direction and the substrate 326 moves in the opposite direction from that of the phase shifter 344 and 346 so that all spurious holograms are prevented from being recorded.

The systems in accordance with the invention have been illustrated as having continual movement of the cover plates or of the substrate and film combination. The principles of the invention are also equally applicable to step movement such as a double exposure type where the cover plates or the substrate and film are moved a distance such that the phase change is $\pi/2$ at the middle of the recording period with the two positions both providing a phase difference relative to the fixed phase of the primary beams. This step exposure arrangement is applicable to simplified systems which use collimated beams. The systems of the invention are not limited to any particular frequency or type of beam and include all laser frequencies, electromagnetic radiation and acoustical beams. Further, depending on the frequency, the structures such as the cover plates may be suitable materials other than glass, such as semiconductor materials. Although the piezoelectric transducers were illustrated as being four in each group, any desired number may be utilized such as three. The principles of the invention are not limited to any particular type of transducer but include piezoelectric devices such as piezoelectric cylinders and piezoelectric stacks, mechanical micrometers, heat controlled units, manual control and electromagnetic transducers. In the illustrated systems, the phase excursions of the reflected beams may be selected to be of any desired amount such as over a portion of a wavelength or several wavelengths. The voltage driving signal of the transducers is not limited to a ramp voltage but may also include other desired waveshapes such as triangular waves. The systems of the invention using shifters are not limited to the illustrated feedback arrangements. Further, the systems of the invention may have both phase shifters controlled by the same driving waveform.

It is to be noted that in the illustrated systems, the surfaces of the mounting plates of the phase shifters and of the cover plates have been illustrated as being similar so that the entire surface of the hologram has equally high intensity. If a special wavefront is generated to correct for optical defects and spherical aberrations, for example, the configuration of the surfaces of the phase shifters may have to be modified accordingly. It is also to be noted that in the illustrated systems, the phase front may be modified to any desired configuration and the phase shifters may be modified accordingly so that the angles of the rays at the moving outer surface of the phase shifters is equal to the angle at the first cover plate. It is to be understood that the inner surfaces of the cover plates do not have to conform to the shape of the substrate or recording medium.

The principles of the invention are not limited to any particular wavelength and are applicable to beams or wavefronts from lasers as well as all electromagnetic radiation emitters and acoustic emitters. Also within the scope of the invention, rays A and B can be from beams resulting from convergent, divergent or collimated sources. The format of the holograms, in accordance with the invention, can be generated by a single overall exposure, a series of adjacent exposures or a series of overlapping exposures, or any combination thereof.

Thus, there has been described systems for the formation of transmission and reflection holograms with the spurious hologram recordings eliminated. By changing the phase relationship between the primary beam rays and the reflected rays, spurious holograms do not substantially record either in a phase type recording medium or in an amplitude type recording medium. The relative movement is selected so that the reflected rays have a greater phase shift than the primary rays and this phase shift difference typically has an excursion of several cycles. In order to compensate the primary beam phases so that they have the same relative phase relationship, phase shifters are provided to cancel the phase shifts of the primary beams. However, the reflected beams still have a varying phase difference relative to the phase of the primary beams with which they would form spurious hologram recordings, so that the spurious recordings are of a very low intensity such that spurious recordings do not appear to be present in the final hologram film after chemical developing. For phase type holographic mediums, the rays that would provide spurious recordings in the systems of the invention only provide a slight decrease of the available index modulation. For amplitude type recording mediums, the rays that would have provided spurious recordings in the systems of the invention only provide a slight darkening of the recording medium or film.

What is claimed is:

1. A system for forming a hologram, comprising means for producing first and second primary coherent beams, a recording medium positioned between first and second cover plates, said first and second beams each passing through one of said cover plates, first means for varying the beam path length of said primary beams and beams reflected from said cover plates between the at least one cover plate and the recording medium; and second means for cancelling said varying path length of said primary beams while maintaining said varying path length of said reflected beams.

2. A system, for forming a hologram, comprising means for producing first and second primary coherent beams, a recording medium positioned between first and second cover plates with an index matching fluid included between said first and second cover plates, the first and second beams each passing to one of said first and second cover plates,
   first means for varying the phases at said recording medium of the primary beams and beams reflected from said cover plates; and
   first and second phase shifting means for cancelling the phase variations of the primary beams to maintain a constant relative phase therebetween while said reflected beams retain a phase variation in relation to the constant relative phase of said first and second primary beams.

3. A system, for forming a hologram, comprising means for producing first and second primary beams, a recording medium positioned between first second cover plates with an index matching fluid maintained between said first and second cover plates, means for continually varying at a first rate the phases of said first and second primary beams at said recording medium during a recording period and for varying, at a second rate greater than said first rate, the phase of beams reflected from a cover plate after passing through said recording medium; and means to vary the phase, at said first rate, of said first and second primary beams prior to passing to one of said cover plates and with a phase variation rate to cancel the phase variation of said first and second primary beams, while retaining a phase variation of said reflected beams equal to the difference between said first and second rates.

4. A system, for forming during a recording period a hologram from first and second primary beams received from first and second sources while eliminating spurious hologram recordings from being formed, comprising:
   a recording structure which has a recording medium and an index matching fluid positioned in spaces between first and second cover plates, and means for varying the phases at said recording medium of rays reflected from at least one of said first and second cover plates.

5. The combination of claim 4 wherein said means for varying the phases also varies the phases at said recording medium of rays of said primary beams and wherein there is further provided first and second phase shifting means for cancelling the phase variations of the primary beams to maintain a constant relative phase therebetween while said reflected beams retain a phase variation therebetween and while they also retain a phase variation relative to the constant relative phase of said first and second primary beams.

6. The combination of claim 5, for forming a transmission hologram, wherein said first and second beams are applied to said first cover plate and wherein the means for varying the phases includes mounting means, a substrate fixedly mounted to said mounting means, first and second transducer means mounted between said mounting means and said respective first and second cover plates, and a source of control signals coupled to said first and second transducer means for moving said cover plates during said recording period.

7. The combination of claim 6 wherein said first and second phase shifting means includes first and second phase shifters respectively positioned in the beam path between said first and second primary beams and said first cover plate, each having mounting means, first windows mounted to the mounting means of said first and second phase shifters, second windows, and transducer means mounted between the mounting means of the first and second phase shifters and said second windows.

8. The combination of claim 7 wherein said source of control signals is coupled to the transducer means of said first phase shifter for continually moving the second windows of said first phase shifter; and wherein there is further provided interferometer means, which has a beam splitter mounted to said substrate, for receiving rays from said first and second phase shifters; said interferometer means providing a control signal to the transducer means of said second phase shifter for moving said second cover plate thereof in correspondence to the movement of the second cover plate of said first phase shifter.

9. The combination of claim 8 wherein said source of control signals is a ramp generator and said control signal from said ramp generator is a voltage ramp for controlling said first and second cover plates and said second window of said first phase shifter so that said first and second cover plates and said first and second windows move in the same direction.

10. The combination of claim 9 wherein the first and second transducer means of said recording structure and the transducer means of said first and second phase shifters are each a plurality of piezoelectric units.

11. The combination of claim 5 for forming a reflection hologram, wherein said means for varying the phases includes mounting means and a substrate having said recording medium attached to a surface thereof, said substrate being mounted to said mounting means, first and second transducer means respectively mounted between said mounting means and said first and second cover plates, and a source of control signals coupled to said first and second transducer means for moving said first and second cover plates during the recording period, said first and second phase shifting means being respectively positioned between the first and second sources of beams and said respective first and second cover plates.

12. The combination of claim 11 wherein said first and second phase shifting means each includes mounting means, a first window fixedly mounted to said mounting means, a second window, and transducer means mounted between said second window and said mounting means, said transducer means of said first phase shifting means being coupled to said source of control signals, said combination further including interferometer means having a beam splitter mounted to said substrate and being responsive to rays passed through said first and second phase shifter means, said interferometer means being coupled to the transducer means of said second phase shifter means for providing control signals thereto representative of the phase shift provided by said first phase shifter means.

13. The combination of claim 12 wherein the first and second transducer means and the transducer means of said first and second phase shifters are each a plurality of piezoelectric units.

14. The combination of claim 13 wherein said source of control signals includes a ramp generator providing voltage ramp signals.

15. The combination of claim 5, for forming a transmission hologram, wherein said means for varying the phases further includes mounting means with said first and second cover plates fixedly mounted to said mounting means, transducer means, and a substrate to which said recording medium is attached, said transducer means being mounted between said mounting means and said substrate, a source of control signals coupled to said transducer means for moving said substrate and recording medium during the recording period, said first and second phase shifting means being respectively positioned between the first and second primary beams and said first cover plate.

16. The combination of claim 15 wherein said first and second phase shifting means each includes mounting means, a first window fixedly mounted to said mounting means, a second window, and transducer means mounted between said second window and said mounting means, said transducer means of said first and second phase shifting means being coupled to said source of control signals.

17. The combination of claim 16 wherein the transducer means for moving said substrate and the transducer means of said first and second phase shifting means are each a plurality of piezoelectric units.

18. The combination of claim 17 wherein said source of control signals includes a ramp generator providing voltage ramp signals for controlling said substrate and recording medium and the second windows of said first and second phase shifter means so that said substrate and recording medium and the second windows of said first and second phase shifters continually move in opposite directions during said recording period.

19. The combination of claim 5, for forming a reflection hologram, wherein said means for varying the phases includes mounting means with said first and second cover plates fixedly mounted to said mounting means, transducer means, and a substrate to which said recording medium is attached, said transducer means being mounted between said mounting means and said substrate, a source of control signals coupled to said transducer means for moving said substrate and recording medium during the recording period, said first and second phase shifting means being respectively positioned between the first and second sources of beams and said respective first and second cover plates.

20. The combination of claim 19 wherein said first and second phase shifting means each includes mounting means, a first window fixedly mounted to said mounting means, a second window and transducer means mounted between said second window and said mounting means, said transducer means of said first phase shifting means being coupled to said source of control signals, said combination further including interferometer means having a beam splitter mounted to said substrate and being responsive to rays passed through said first and second phase shifting means, said interferometer means coupled to the transducer means of said second phase shifter means for providing control signals thereto representative of the phase shift provided by the first phase shifter means.

21. The combination of claim 20 wherein the transducer means for moving said substrate and the transducer means of said first and second phase shifting means are each a plurality of piezoelectric units.

22. The combination of claim 21 wherein said source of control signals includes a ramp generator providing voltage ramp signals for controlling said substrate and recording medium and the second window of said first phase shifting means so that said first and second phase shifters continually move in opposite directions and said substrate continually moves in the direction of one of said phase shifters during said recording period.

23. A system, for forming during a recording period a hologram from first and second primary beams received from first and second sources while eliminating spurious hologram recordings from being formed comprising:
  a recording structure which has a recording medium and an index mtching fluid positioned between first and second cover plates, and means for varying the phases at said recording medium of rays of the primary beams versus rays reflected from at least one of said first and second cover plates.

24. The combination of claim 23, for forming a transmission hologram, wherein said first and second beams are applied to said first cover plate and wherein the phase varying means comprises:
  mounting means;
  a substrate fixedly mounted to said mounting means;
  first and second transducer means mounted between said mounting means and said respective first and second cover plates; and
  a source of control signals coupled to said first and second transducer means for moving said cover plates during said recording period.

25. A system, for forming during a recording period a hologram from first and second primary beams received from first and second sources and applied to a recording structure which has a recording medium and an index matching fluid positioned in spaces between first and second cover plates while eliminating spurious hologram recordings from being formed from rays reflected from said first and second cover plates, comprising:

first means for varying the phases at said recording medium of said reflected beams and for varying the phases of said primary beams; and second means for varying the phases of said primary beams so that the primary beams have constant phases at said recording medium.

26. A system for forming a hologram comprising a recording structure including a recording medium positioned between first and second cover plates, means for producing first and second primary beams applied to said first and second cover plates respectively, said beams partially passing through said plates and partially reflecting therefrom, and means for varying the path length of said reflected beams between the cover plates and the recording medium.

27. The combination of claim 26 wherein the varying means varies the path length of the reflected beams relative to the path length of the primary beams.

28. A system for forming a hologram comprising a recording structure including a recording medium positioned between first and second cover plates, means for producing first and second primary beams applied to said first and second cover plates respectively, said beams partially passing through said plates and partially reflecting therefrom, and means for moving said recording structure during a recording period.

29. The combination of claim 28 wherein said moving means comprises means for relatively moving elements of said recording structure.

* * * * *

UNITED STATES PATENT AND TRADEMARK OFFICE
CERTIFICATE OF CORRECTION

PATENT NO. : 4,458,978
DATED : July 10, 1984
INVENTOR(S) : JAMES A. ARNS ET AL

It is certified that error appears in the above—identified patent and that said Letters Patent is hereby corrected as shown below:

Claim 3, line 3, "first second" should read --first and second--.

Signed and Sealed this

Sixteenth Day of October 1984

[SEAL]

Attest:

GERALD J. MOSSINGHOFF

*Attesting Officer*     *Commissioner of Patents and Trademarks*